(No Model.)
J. A. DOWNEY.
TOASTER.
No. 373,276.　　　　　　　Patented Nov. 15, 1887.
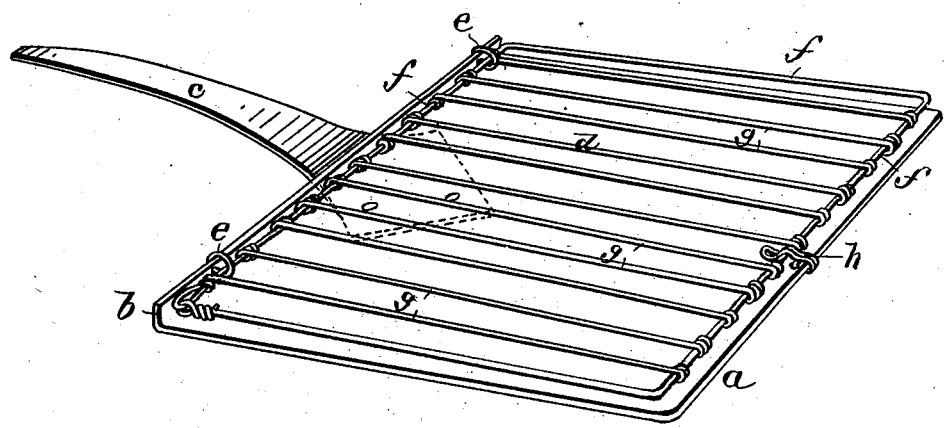
WITNESSES:
INVENTOR:
J. A. Downey
BY Munn & Co.
ATTORNEYS.

UNITED STATES PATENT OFFICE.

JULIA A. DOWNEY, OF OBERLIN, OHIO.

TOASTER.

SPECIFICATION forming part of Letters Patent No. 373,276, dated November 15, 1887.

Application filed April 25, 1887. Serial No. 236,100. (No model.)

*To all whom it may concern:*

Be it known that I, JULIA A. DOWNEY, of Oberlin, in the county of Lorain and State of Ohio, have invented a new and Improved Toaster, of which the following is a full, clear, and exact description.

The object of the invention is to provide a toaster for gasoline-stoves which shall be simple in construction and effective in operation, preventing the gases from the flame of the stove from injuriously affecting the bread being toasted.

The invention consists of a toasting-plate provided with a suitable handle, and which has hinged to it a wire frame, as hereinafter described and claimed.

Reference is to be had to the accompanying drawing, forming a part of this specification, in which is shown in perspective a toaster constructed in accordance with my invention.

The toasting-plate $a$, made preferably of steel and of a size to fit the opening in the top of a gasoline-stove, is formed with an upturned rear end, $b$, and is provided with a suitable handle, $c$. Hinged to the upturned rear end, $b$, of the plate $a$ is a wire frame, $d$, of approximately the same size as the said plate. The wire frame $d$ is hinged to the plate $a$ by rings $e$, that encircle the rear wire of said frame and pass through apertures in the upturned rear end of plate $a$.

The wire frame consists of the outer rectangularly-bent wire, $f$, and the wires $g$, that extend from the front to rear of the frame, their ends being bent around the rectangular wire $f$. A catch, $h$, at the front of plate $a$, serves to hold the frame $d$ down on the same.

The toaster is placed in the opening in a gasoline-stove, the toasting-plate $a$ being lowermost, and the bread to be toasted is placed on the wire frame $d$, whereby the bread will be toasted without the gases from the flame coming in contact therewith, and without being burned by contacting with the plate $a$.

Having thus described my invention, what I claim as new, and desire to secure by Letters Patent, is—

The toasting-plate $a$, having an upturned rear end, $b$, and a suitable handle, $c$, in combination with the wire frame $d$, hinged to the upturned rear end of said plate by means of hinges $e$, and a catch, $h$, substantially as shown and described.

JULIA A. DOWNEY.

Witnesses:
EDWARD R. LEARNED,
ELLA B. DOWNEY.